(12) United States Patent
Yan

(10) Patent No.: US 10,158,649 B2
(45) Date of Patent: Dec. 18, 2018

(54) METHOD AND APPARATUS FOR PRIVACY-ENHANCED EVIDENCE EVALUATION

(71) Applicant: Nokia Technologies Oy, Espoo (FI)

(72) Inventor: Zheng Yan, Xi'an (CN)

(73) Assignee: Nokia Technologies Oy, Espoo (FI)

(*) Notice: Subject to any disclaimer, the term of this patent is extended or adjusted under 35 U.S.C. 154(b) by 275 days.

(21) Appl. No.: 14/912,275

(22) PCT Filed: Aug. 20, 2013

(86) PCT No.: PCT/CN2013/081824
§ 371 (c)(1),
(2) Date: Feb. 16, 2016

(87) PCT Pub. No.: WO2015/024173
PCT Pub. Date: Feb. 26, 2015

(65) Prior Publication Data
US 2016/0205114 A1 Jul. 14, 2016

(51) Int. Cl.
H04L 29/06 (2006.01)
H04L 9/00 (2006.01)
(Continued)

(52) U.S. Cl.
CPC .............. H04L 63/12 (2013.01); H04L 9/008 (2013.01); H04L 63/08 (2013.01); H04W 12/10 (2013.01);
(Continued)

(58) Field of Classification Search
USPC ........ 713/168, 150, 163, 181; 726/2, 21, 36; 380/255, 264, 276
See application file for complete search history.

(56) References Cited

U.S. PATENT DOCUMENTS 9,077,690 B2 7/2015 Yan
9,419,820 B1* 8/2016 Liang .................... H04L 12/581
(Continued)

FOREIGN PATENT DOCUMENTS

CN 101765231 A 6/2010
CN 102546602 A 7/2012
CN 102916954 A 2/2013

OTHER PUBLICATIONS

International Search Report and Written Opinion received for corresponding Patent Cooperation Treaty Application No. PCT/CN2013/081824, dated Apr. 3, 2014, 10 pages.
(Continued)

Primary Examiner — Sharif E Ullah
(74) Attorney, Agent, or Firm — Mintz Levin Cohn Ferris Glovsky and Popeo, P.C.

(57) ABSTRACT

A method for privacy-enhanced evidence evaluation may comprise: sending a request for pre-evaluation information regarding evidence data of a target object to a first network entity from a requesting node; obtaining the pre-evaluation information from the first network entity, in response to successful verification of the requesting node at a second network entity; and calculating an evidence evaluation of the target object based at least in part on the pre-evaluation information, wherein the pre-evaluation information comprises re-encrypted evidence data of the target object associated with one or more time slots, and wherein the re-encrypted evidence data of the target object at an associated time slot is resulted at least in part from encrypted evidence data of the target object collected by the first network entity from one or more evidence providers at the associated time slot, by using a re-encryption key from the second network entity.

14 Claims, 6 Drawing Sheets

(51) Int. Cl.
*H04W 12/10* (2009.01)
*H04W 12/02* (2009.01)
*H04W 4/21* (2018.01)

(52) U.S. Cl.
CPC ........... *H04L 63/0428* (2013.01); *H04W 4/21* (2018.02); *H04W 12/02* (2013.01)

(56) References Cited

U.S. PATENT DOCUMENTS

| | | |
|---|---|---|
| 2009/0136033 A1 | 5/2009 | Sy |
| 2010/0115129 A1* | 5/2010 | Hwang .................. G06F 8/427 709/242 |
| 2010/0205430 A1* | 8/2010 | Chiou .................... G06Q 10/10 713/156 |
| 2011/0078775 A1* | 3/2011 | Yan ......................... G06F 21/57 726/6 |
| 2013/0110876 A1 | 5/2013 | Meijer et al. |
| 2015/0222606 A1* | 8/2015 | Yan ....................... H04L 9/0847 713/171 |

OTHER PUBLICATIONS

Ayday, Erman, Jean Louis Raisaro, and Jean-Pierre Hubaux. Privacy-enhancing technologies for medical tests using genomic data. No. EPFL-Report-182897. 2012.

* cited by examiner

METHOD AND APPARATUS FOR PRIVACY-ENHANCED EVIDENCE EVALUATION

RELATED APPLICATION

This application was originally filed as Patent Cooperation Treaty Application No. PCT/CN2013/081824 filed Aug. 20, 2013.

FIELD OF THE INVENTION

The present invention generally relates to social communications. More specifically, the invention relates to a method and apparatus for privacy-enhanced evidence evaluation.

BACKGROUND

The modern communications era has brought about a tremendous expansion of communication networks. Communication service providers and device manufacturers are continually challenged to deliver value and convenience to consumers by, for example, providing compelling network services, applications, and contents. The development of communication technologies has contributed to an insatiable desire for new functionalities. One area of interest is the development of services and technologies for supporting evidence evaluation or trust evaluation to provide trust intelligence in computing and networking systems. Current methods of trust evaluation generally apply various theories to aggregate trust evidence or trust data collected from different parties and the evaluator itself for calculating a trust value. In social networking, a large number of social data are collected in order to evaluate the trust of each social entity for trustworthy social networking and communications. However, aggregating or processing the collected data could impact the privacy of raw data provider or the human-beings being evaluated. This is because mining collected plain data could find a clue of human privacy, such as routine activities, preferences or interests, which in many cases cannot be accepted by system or service users, thus greatly impacts the final success of a reputation system or a computing system or a service. It is preferred that the collected data is encrypted and processed in an encrypted manner and the final processing result can be accessed by an authorized party for the purpose of enhancing the privacy of data owner or the entity related to the collected data.

SUMMARY

The present description introduces a solution for privacy-preserved evidence evaluation. The term of "evidence" herein may comprise the knowledge about a target object (for example, a trustee, an observed party or an evaluated entity such as a service, an application, an event, a user or a networking node), where such knowledge may comprise, for example, feedback about the target object's performance and quality, the observed factors about the target object, other entities' recommendations or opinions on the target object, relevant information or data processed for the target object, the statistics regarding the target object, a kind of voting (such as "like it") on the target object, etc.

According to a first aspect of the present invention, there is provided a method comprising: sending a request for pre-evaluation information regarding evidence data of a target object to a first network entity from a requesting node; obtaining the pre-evaluation information from the first network entity, in response to successful verification of the requesting node at a second network entity; and calculating an evidence evaluation of the target object based at least in part on the pre-evaluation information, wherein the pre-evaluation information comprises re-encrypted evidence data of the target object associated with one or more time slots, and wherein the re-encrypted evidence data of the target object at an associated time slot is resulted at least in part from encrypted evidence data of the target object collected by the first network entity from one or more evidence providers at the associated time slot, by using a re-encryption key from the second network entity.

According to a second aspect of the present invention, there is provided an apparatus comprising: at least one processor; and at least one memory comprising computer program code, the at least one memory and the computer program code configured to, with the at least one processor, cause the apparatus at least to: send a request for pre-evaluation information regarding evidence data of a target object to a first network entity; obtain the pre-evaluation information from the first network entity, in response to successful verification of the apparatus at a second network entity; and calculate an evidence evaluation of the target object based at least in part on the pre-evaluation information, wherein the pre-evaluation information comprises re-encrypted evidence data of the target object associated with one or more time slots, and wherein the re-encrypted evidence data of the target object at an associated time slot is resulted at least in part from encrypted evidence data of the target object collected by the first network entity from one or more evidence providers at the associated time slot, by using a re-encryption key from the second network entity.

According to a third aspect of the present invention, there is provided a computer program product comprising a computer-readable medium bearing computer program code embodied therein for use with a computer, the computer program code comprising: code for sending a request for pre-evaluation information regarding evidence data of a target object to a first network entity from a requesting node; code for obtaining the pre-evaluation information from the first network entity, in response to successful verification of the requesting node at a second network entity; and code for calculating an evidence evaluation of the target object based at least in part on the pre-evaluation information, wherein the pre-evaluation information comprises re-encrypted evidence data of the target object associated with one or more time slots, and wherein the re-encrypted evidence data of the target object at an associated time slot is resulted at least in part from encrypted evidence data of the target object collected by the first network entity from one or more evidence providers at the associated time slot, by using a re-encryption key from the second network entity.

According to a fourth aspect of the present invention, there is provided an apparatus comprising: sending means for sending a request for pre-evaluation information regarding evidence data of a target object to a first network entity; obtaining means for obtaining the pre-evaluation information from the first network entity, in response to successful verification of the apparatus at a second network entity; and calculating means for calculating an evidence evaluation of the target object based at least in part on the pre-evaluation information, wherein the pre-evaluation information comprises re-encrypted evidence data of the target object associated with one or more time slots, and wherein the re-encrypted evidence data of the target object at an associated time slot is resulted at least in part from encrypted evidence data of the target object collected by the first network entity from one or more evidence providers at the associated time slot, by using a re-encryption key from the second network entity.

According to exemplary embodiments, the one or more evidence providers may comprise the requesting node. The request for the pre-evaluation information may comprise a credential for verifying the requesting node. In an exemplary embodiment, the encrypted evidence data of the target object collected from a corresponding evidence provider at the associated time slot may comprise: encrypted evidence data of the target object by the corresponding evidence provider using an encryption key from the second network entity. In another exemplary embodiment, the encrypted evidence data of the target object collected from the one or more evidence providers at the associated time slot may be processed at the first network entity based at least in part on a homomorphic encryption scheme.

According to exemplary embodiments, the re-encrypted evidence data of the target object at the associated time slot may comprise: encrypted evidence data of the target object at the associated time slot by using a public key of the requesting node. For example, the evidence evaluation of the target object may be calculated by: decrypting the re-encrypted evidence data of the target object by using a private key of the requesting node; and estimating the evidence evaluation of the target object based at least in part on a decryption result of the re-encrypted evidence data of the target object. Optionally, a local evidence record of the target object at the requesting node may be used in calculating the evidence evaluation of the target object based at least in part on the pre-evaluation information. In an exemplary embodiment, statistical information for the associated time slot may be obtained from the first network entity by the requesting node for calculating the evidence evaluation of the target object.

According to a fifth aspect of the present invention, there is provided a method comprising: collecting encrypted evidence data of a target object associated with one or more time slots by a first network entity; forwarding, in response to receipt of a request for pre-evaluation information regarding evidence data of the target object from a requesting node, the request to a second network entity from the first network entity; receiving a re-encryption key from the second network entity, in response to successful verification of the requesting node at the second network entity; and sending the pre-evaluation information to the requesting node for calculating an evidence evaluation of the target object, wherein the pre-evaluation information comprises re-encrypted evidence data of the target object associated with the one or more time slots, and wherein the re-encrypted evidence data of the target object at an associated time slot is resulted at least in part from the encrypted evidence data of the target object collected from one or more evidence providers at the associated time slot, by using the re-encryption key.

According to a sixth aspect of the present invention, there is provided an apparatus comprising: at least one processor; and at least one memory comprising computer program code, the at least one memory and the computer program code configured to, with the at least one processor, cause the apparatus at least to: collect encrypted evidence data of a target object associated with one or more time slots; forward, in response to receipt of a request for pre-evaluation information regarding evidence data of the target object from a requesting node, the request to another apparatus; receive a re-encryption key from the another apparatus, in response to successful verification of the requesting node at the another apparatus; and send the pre-evaluation information to the requesting node for calculating an evidence evaluation of the target object, wherein the pre-evaluation information comprises re-encrypted evidence data of the target object associated with the one or more time slots, and wherein the re-encrypted evidence data of the target object at an associated time slot is resulted at least in part from the encrypted evidence data of the target object collected from one or more evidence providers at the associated time slot, by using the re-encryption key.

According to a seventh aspect of the present invention, there is provided a computer program product comprising a computer-readable medium bearing computer program code embodied therein for use with a computer, the computer program code comprising: code for collecting encrypted evidence data of a target object associated with one or more time slots by a first network entity; code for forwarding, in response to receipt of a request for pre-evaluation information regarding evidence data of the target object from a requesting node, the request to a second network entity from the first network entity; code for receiving a re-encryption key from the second network entity, in response to successful verification of the requesting node at the second network entity; and code for sending the pre-evaluation information to the requesting node for calculating an evidence evaluation of the target object, wherein the pre-evaluation information comprises re-encrypted evidence data of the target object associated with the one or more time slots, and wherein the re-encrypted evidence data of the target object at an associated time slot is resulted at least in part from the encrypted evidence data of the target object collected from one or more evidence providers at the associated time slot, by using the re-encryption key.

According to an eighth aspect of the present invention, there is provided an apparatus comprising: collecting means for collecting encrypted evidence data of a target object associated with one or more time slots; forwarding means for forwarding, in response to receipt of a request for pre-evaluation information regarding evidence data of the target object from a requesting node, the request to another apparatus; receiving means for receiving a re-encryption key from the another apparatus, in response to successful verification of the requesting node at the another apparatus; and sending means for sending the pre-evaluation information to the requesting node for calculating an evidence evaluation of the target object, wherein the pre-evaluation information comprises re-encrypted evidence data of the target object associated with the one or more time slots, and wherein the re-encrypted evidence data of the target object at an associated time slot is resulted at least in part from the encrypted evidence data of the target object collected from one or more evidence providers at the associated time slot, by using the re-encryption key.

According to exemplary embodiments, the apparatus in the sixth/eighth aspect of the present invention may comprise a first network entity, and the another apparatus in the sixth/eighth aspect of the present invention may comprise a second network entity. In accordance with exemplary embodiments, the encrypted evidence data of the target object collected from the one or more evidence providers at the associated time slot may be processed at the first network entity based at least in part on a homomorphic encryption scheme. In particular, the re-encrypted evidence data of the target object at the associated time slot may comprise: encrypted evidence data of the target object at the associated time slot by using a public key of the requesting node.

According to exemplary embodiments, statistical information for the associated time slot may be monitored by the first network entity and provided to the requesting node for calculating the evidence evaluation of the target object. For example, the statistical information may indicate a number of evidence providers from which the encrypted evidence data of the target object is collected by the first network entity at the associated time slot.

According to a ninth aspect of the present invention, there is provided a method comprising: receiving a request forwarded from a first network entity to a second network entity, wherein the request is initiated by a requesting node for obtaining pre-evaluation information regarding evidence data of a target object from the first network entity; verifying the requesting node at the second network entity, based at least in part on the request; and sending a re-encryption key to the first network entity from the second network entity, in response to successful verification of the requesting node; wherein the pre-evaluation information comprises re-encrypted evidence data of the target object associated with one or more time slots and is used for calculating an evidence evaluation of the target object, and wherein the re-encrypted evidence data of the target object at an associated time slot is resulted at least in part from encrypted evidence data of the target object collected by the first network entity from one or more evidence providers at the associated time slot, by using the re-encryption key.

According to a tenth aspect of the present invention, there is provided an apparatus comprising: at least one processor; and at least one memory comprising computer program code, the at least one memory and the computer program code configured to, with the at least one processor, cause the apparatus at least to: receive a request forwarded from another apparatus to the apparatus, wherein the request is initiated by a requesting node for obtaining pre-evaluation information regarding evidence data of a target object from the another apparatus; verify the requesting node at the apparatus, based at least in part on the request; and send a re-encryption key to the another apparatus, in response to successful verification of the requesting node; wherein the pre-evaluation information comprises re-encrypted evidence data of the target object associated with one or more time slots and is used for calculating an evidence evaluation of the target object, and wherein the re-encrypted evidence data of the target object at an associated time slot is resulted at least in part from encrypted evidence data of the target object collected by the another apparatus from one or more evidence providers at the associated time slot, by using the re-encryption key.

According to a eleventh aspect of the present invention, there is provided a computer program product comprising a computer-readable medium bearing computer program code embodied therein for use with a computer, the computer program code comprising: code for receiving a request forwarded from a first network entity to a second network entity, wherein the request is initiated by a requesting node for obtaining pre-evaluation information regarding evidence data of a target object from the first network entity; code for verifying the requesting node at the second network entity, based at least in part on the request; and code for sending a re-encryption key to the first network entity from the second network entity, in response to successful verification of the requesting node; wherein the pre-evaluation information comprises re-encrypted evidence data of the target object associated with one or more time slots and is used for calculating an evidence evaluation of the target object, and wherein the re-encrypted evidence data of the target object at an associated time slot is resulted at least in part from encrypted evidence data of the target object collected by the first network entity from one or more evidence providers at the associated time slot, by using the re-encryption key.

According to a twelfth aspect of the present invention, there is provided an apparatus comprising: receiving means for receiving a request forwarded from another apparatus to the apparatus, wherein the request is initiated by a requesting node for obtaining pre-evaluation information regarding evidence data of a target object from the another apparatus; verifying means for verifying the requesting node at the apparatus, based at least in part on the request; and sending means for sending a re-encryption key to the another apparatus, in response to successful verification of the requesting node; wherein the pre-evaluation information comprises re-encrypted evidence data of the target object associated with one or more time slots and is used for calculating an evidence evaluation of the target object, and wherein the re-encrypted evidence data of the target object at an associated time slot is resulted at least in part from encrypted evidence data of the target object collected by the another apparatus from one or more evidence providers at the associated time slot, by using the re-encryption key.

According to exemplary embodiments, the apparatus in the tenth/twelfth aspect of the present invention may comprise a second network entity, and the another apparatus in the tenth/twelfth aspect of the present invention may comprise a first network entity. In accordance with exemplary embodiments, the encrypted evidence data of the target object collected from a corresponding evidence provider at the associated time slot may comprise: encrypted evidence data of the target object by the corresponding evidence provider using an encryption key from the second network entity. For example, the encryption key from the second network entity may comprise a public key of the second network entity.

In exemplary embodiments of the present invention, the provided methods, apparatus, and computer program products can provide privacy enhancement in evidence evaluation (such as trust evaluation in reputation systems). Particularly, the proposed solution can support privacy-preserved evidence evaluation by applying homomorphic encryption and proxy based re-encryption. Using the proposed solution, an individual evidence provider's opinion/experience on a target object can be hidden by encryption, which greatly preserves the evidence provider's privacy. In addition, the encrypted pre-evaluation result can only be accessed by authorized parties by applying proxy based re-encryption, which further improves the system security and privacy.

BRIEF DESCRIPTION OF THE DRAWINGS

The invention itself, the preferable mode of use and further objectives are best understood by reference to the following detailed description of the embodiments when read in conjunction with the accompanying drawings, in which.

DETAILED DESCRIPTION OF THE INVENTION

Figure 1:
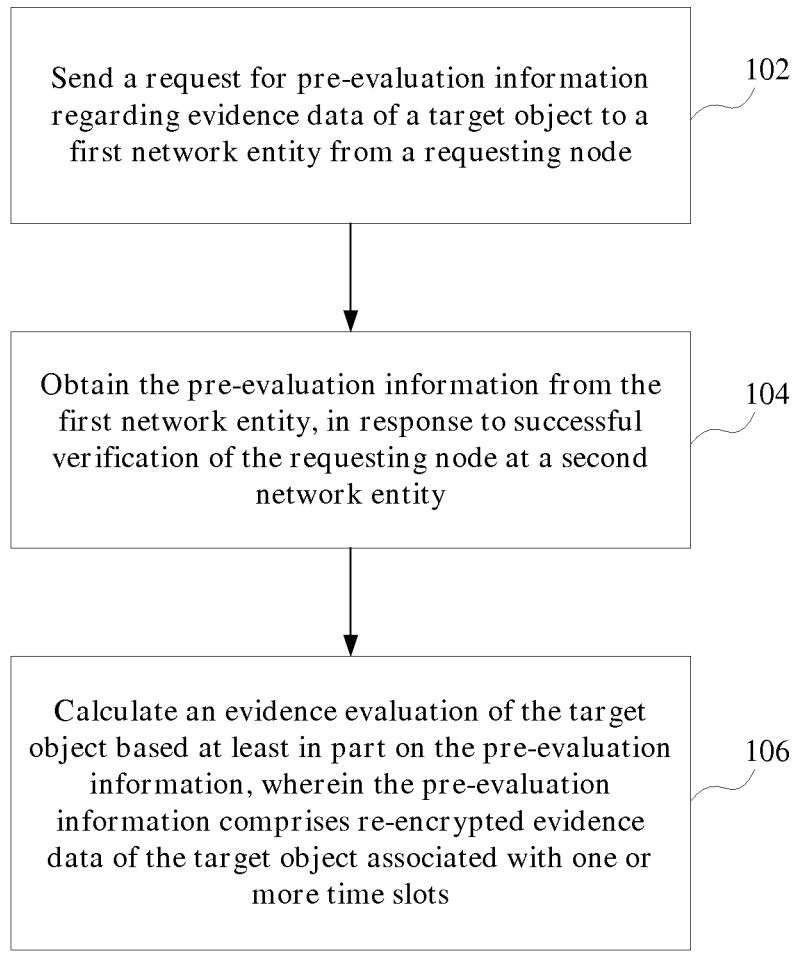
FIG. 1 is a flowchart illustrating a method for privacy-enhanced evidence evaluation, which may be performed at a requesting node for evidence data of a target object in accordance with embodiments of the present invention.

The embodiments of the present invention are described in details with reference to the accompanying drawings. Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

Trust management may be concerned with: collecting the information required to make a trust relationship decision; evaluating the criteria related to the trust relationship; monitoring and reevaluating existing trust relationships; as well as ensuring the dynamically changed trust relationships and automating the process. Trust and reputation mechanisms have been widely studied in various fields of distributed systems, such as mobile ad hoc network (MANET), Peer-to-Peer (P2P) systems, Grid computing, pervasive computing and the like. Many mechanisms have been developed for supporting trusted communications and collaborations among computing nodes. Examples are FuzzyTrust system, PeerTrust system, Objective Trust Management Framework (OTMF) for MANET, etc. Some work evaluates trust based on social relationships. In these researches, trust can be modeled, calculated and thus expressed using a value. Trust evaluation is an important aspect in trust management. It is a technical approach of representing trust for digital processing, in which the factors influencing trust may be evaluated by a continuous or discrete real number, referred to as a trust value. Embedding a trust evaluation mechanism is a necessity to provide trust intelligence in computing and networking systems. Trust evaluation is the main aspect in the research for the purpose of digitalizing trust.

Generally, trust may be evaluated based on the evidence that shows a trustor's belief on a trustee. The evidence may contain the knowledge about the trustee, such as feedback about trustee's performance and quality, the observed factors about the trustee, other entities' recommendations or opinions on the trustee, etc. In many application scenarios or systems, data are collected from different entities in order to conduct trust evaluation by a party (such as a trustor). For example, a reputation server collects individual feedback, votes or opinions from many users on an entity such as a mobile application, a movie or a service, or a networking node for the purpose of evaluating trust in this entity. In another example, in Pervasive Social Networking (PSN) based on the Internet or a self-organized MANET, social reputation can be generated by collecting social behaviors and/or feedback from all nodes in the network in order to evaluate the trust of each social party. In the example of Internet of Things (IoT), data sensed/observed/collected from the "things" would be further sent to a higher-layer party for processing. The processing result can be provided to some users in order to offer intelligent services. However, in most of work on trust and reputation management, trust evidence privacy in the procedure of evidence collection and process is seldom concerned. Generally, plain data are collected and processed for generating a trust value. The problem about the privacy of provided data and the security of personal information has not been carefully studied in the current reputation systems in order to preserve system and user privacy. For example, collecting data from different entities could impact the privacy of the entities, and mining data provided by those entities could disclose their personal information, thus cause risks or bring dangers to the raw data provider or the human-beings being evaluated. How to enhance the privacy in trust/reputation or evidence evaluation becomes an important issue that could greatly influences the success of a reputation system, a computing system or a service, and user acceptance in real practice.

Secure Multi-Party Computation (SMC) is a paradigm that keeps data of individual parties as secret and provides the private data for computation to evaluate some function of their common interest. The outcome of the computation is made available to all the parties. SMC enables parties with private data to collaboratively compute a global function of their private data, without revealing that data. Secure Multi-Party Computation allows parties with similar background to compute results upon their private data, minimizing the threat of disclosure. The exponential increase in sensitive data that needs to be passed upon networked computers and the stupendous growth of internet has precipitated vast opportunities for cooperative computation, where parties come together to facilitate computations and draw out conclusions that are mutually beneficial; at the same time aspiring to keep their private data secure. These computations are generally required to be done between competitors, who are obviously weary of each-others intentions. SMC caters not only to the needs of such parties but also provides plausible solutions to individual organizations for problems like privacy-preserving database query, privacy-preserving scientific computations, privacy-preserving intrusion detection and privacy-preserving data mining.

In accordance with exemplary embodiments of the present invention, a novel solution is proposed to support privacy enhancement in evidence evaluation (such as trust evaluation in reputation systems). More generally, the proposed solution enables privacy-preserved (or privacy-enhanced) evidence evaluation, especially in a social networking environment. According to exemplary embodiments, two network entities such as an Authorized Proxy (AP) and an Evaluation Party (EP) may be applied for privacy-preserved evidence evaluation on one or more target objects. For example, the AP and the EP may be two independent parties who do not collude according to a specified rule or due to business incentive and reason. The AP may be responsible for generating data re-encryption keys on encrypted data, and the EP (for example, offered by a Cloud Service Provider (CSP) or other suitable service providers) may be responsible for processing the data collected from a number of evidence providers (such as users, terminals or nodes in a network). More details of the proposed solution will be illustrated hereinafter by way of example with reference to the accompanying drawings.

FIG. 1 is a flowchart illustrating a method for privacy-enhanced evidence evaluation, which may be performed at a requesting node for evidence data of a target object in accordance with embodiments of the present invention. The method illustrated in FIG. 1 may be applicable to a communications network such as MANET, PSN system, mesh network, P2P network and any other networks suitable for evidence collection and evaluation. It is contemplated that the requesting node for the evidence data described herein may comprise any apparatus connected to a service network such as Internet, mobile network, computing network or any other systems suitable for providing or supporting evidence collection and evaluation. The apparatus may be any type of mobile terminal, fixed terminal, or portable terminal comprising a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, comprising the accessories and peripherals of these devices, or any combination thereof. The target object described herein may comprise, for example, an observed party, a trustee, or an evaluated entity such as a service, an application, an event, a user or a networking node. In particular, the requesting node also may be regarded as a target object of which relevant evidence data may be provided or voted by other parties or nodes.

According to exemplary embodiments, the requesting node can send a request for pre-evaluation information regarding evidence data of a target object to a first network entity (such as an EP), as shown in block 102 of FIG. 1. For example, the request for the pre-evaluation information may comprise a credential for verifying the requesting node. The first network entity may forward the received request to the second network entity (such as an AP) for verifying the requesting node. In an exemplary embodiment, the requesting node may register itself into the second network entity, for example, by providing its public key during a system setup procedure. Upon successful registration, the second network entity may issue its public key to the requesting node, together with the signed public key of the requesting node by a private key of the second network entity. Accordingly, the credential in the request may comprise, for example, the public key of the requesting node, or the signed public key of the requesting node provided by the second network entity previously. Thus, the second network entity can perform a verification of the requesting node based at least in part on the received request. In response to successful verification of the requesting node at the second network entity, the requesting node can obtain the pre-evaluation information from the first network entity, as shown in block 104. The pre-evaluation information may be resulted at least in part from processing of encrypted evidence data of the target object collected by the first network entity from different evidence providers in the network, as described in connection with FIG. 2.

Based at least in part on the pre-evaluation information, the requesting node can calculate an evidence evaluation of the target object in block 106, wherein the pre-evaluation information may comprise re-encrypted evidence data of the target object associated with one or more time slots. In an exemplary embodiment, the one or more time slots may be related to a time window of which a range may be predefined or negotiated between the requesting node and the first network entity. For example, it may be predefined that the pre-evaluation information provided by the first network entity would contain the re-encrypted evidence data of the target object associated with a reasonable number of time slots before the first network entity receives the request from the requesting node. The reasonable number of time slots may comprise several time slots in view of traffic or communication capability; or range from the first time slot in which the first network entity starts to collect the encrypted evidence data of the target object, to the last time slot before the first network entity receives the request for the pre-evaluation information about the target object. Alternatively, the requesting node may indicate in the request that the pre-evaluation information corresponding to a certain number of time slots is required, where the certain number of time slots may be determined based at least in part on the time of obtaining the previous pre-evaluation information by the requesting node from the first network entity. In an exemplary embodiment, the re-encrypted evidence data of the target object at an associated time slot may be resulted at least in part from encrypted evidence data of the target object collected by the first network entity from one or more evidence providers at the associated time slot, by using a re-encryption key from the second network entity. Such idea of using proxy based re-encryption allows only an authorized requesting node can access and decrypt the pre-evaluation information to get the evidence evaluation of the target object. On the other hand, encryption of the collected information (such as the encrypted evidence data of the target object) from an evidence provider can enable personal information of this evidence provider to be hidden at least from the first network entity, since the first network entity has no way to know plain texts of the collected information and is impossible to track the privacy of the evidence provider. Moreover, considering that the first network entity (such as the EP) and the second network entity (such as the AP) do not collude, it is impossible for the second network entity to know the above collected information either. In an exemplary embodiment, identity information of the target object provided by an evidence provider can be also encrypted and hidden from the first network entity, thus the first network entity cannot get such identity information even when it extracts the pre-evaluation information about the target object.

In an exemplary embodiment, the encrypted evidence data of the target object collected from a corresponding evidence provider at the associated time slot may comprise: encrypted evidence data of the target object by the corresponding evidence provider using an encryption key from the second network entity. For example, the corresponding evidence provider may vote or collect evidence on the target object, and in order to preserve its personal privacy, the corresponding evidence provider may encrypt its collected evidence on the target object with a shared key (such as a public key) of the second network entity. Then the first network entity can gather such encrypted evidence data of the target object from different evidence providers. In particular, the one or more evidence providers from which the encrypted evidence data of the target object collected by the first network entity may comprise the requesting node. In this case, the requesting node may think that its local vote on the target object is not enough for evaluating final evidence of the target object, thus it needs to aggregate collaborative opinions on the target object from other evidence providers by requesting the pre-evaluation information from the first network entity.

According to an exemplary embodiment, the encrypted evidence data of the target object collected from the one or more evidence providers at the associated time slot may be processed at the first network entity based at least in part on a homomorphic encryption scheme. In general, the homomorphic encryption scheme can solve the issue of statistics problem in SMC where multiple parties visit a public database secretly and the owner of the database does statistics on the accessing information. In the exemplary embodiment, an individual evidence provider's opinion/experience on the target object can be hidden by using the homomorphic encryption, thus greatly preserves the evidence provider's privacy since the pre-evaluation information calculated by the first network entity would not disclose individual information. More details of the homomorphic encryption scheme will be illustrated hereinafter by way of example with reference to FIG. 2. In an exemplary embodiment where the homomorphic encryption scheme is applied, the encrypted evidence data of the target object collected from the one or more evidence providers at the associated time slot may be processed as the encrypted evidence data in an aggregation form, for example, encrypted sum of evidence data of the target object from different evidence providers, as illustrated in combination with FIG. 2 and FIG. 5. Then the first network entity may re-encrypt the homomorphic encryption result with the re-encryption key from the second network entity, so as to get the re-encrypted evidence data of the target object. In an exemplary embodiment, the re-encrypted evidence data of the target object at the associated time slot may comprise: encrypted evidence data of the target object at the associated time slot by using a public key of the requesting node. Thus, when the first network entity sends the re-encryption result as at least part of the pre-evaluation information to the requesting node which is authorized to decrypt the result, the requesting node can calculate the evidence evaluation of the target object with a corresponding key. For example, the evidence evaluation of the target object may be calculated by: decrypting the re-encrypted evidence data of the target object by using a private key of the requesting node; and estimating the evidence evaluation of the target object based at least in part on a decryption result of the re-encrypted evidence data of the target object.

According to an exemplary embodiment, some statistical information for a specific time slot also may be obtained from the first network entity by the requesting node for calculating the evidence evaluation of the target object. The statistical information may indicate a number of evidence providers from which the encrypted evidence data of the target object is collected by the first network entity at the specific time slot. In an exemplary embodiment, the requesting node may get information from the first network entity to indicate the association relationship among the re-encrypted evidence data of the target object, the statistical information and the one or more time slots. Optionally, a local evidence record of the target object at the requesting node may be used in calculating the evidence evaluation of the target object based at least in part on the pre-evaluation information. For example, the local evidence record of the target object at the requesting node may comprise: an evidence evaluation of the target object provided by the requesting node locally (for example, from its social interaction experiences with the target object), or an evidence evaluation of the target object calculated based at least in part on the previous pre-evaluation information obtained from the first network entity in response to a previous request by the requesting node. Additionally or alternatively, some potential attacks on the evidence evaluation, such as bad mouthing and collaborative bad mouthing attack, on-off attack and conflict behavior attack, also may be considered in calculating the evidence evaluation of the target object by the requesting node, as illustrated in combination with FIG. 5. Thus, the requesting node according to exemplary embodiments can compute an entity's evidence (such as a trust value), for example, by aggregating the decrypted result, other relevant information (such as statistical information) provided by the first network entity (such as the EP), and/or the data accumulated at the requesting node locally. In this way, the trustworthy evidence evaluation on the target object can be achieved and at the same time the privacy of evidence providers can be preserved since after homomorphic encryption, individual opinion or experiences on the target object can be hidden.

Figure 2:
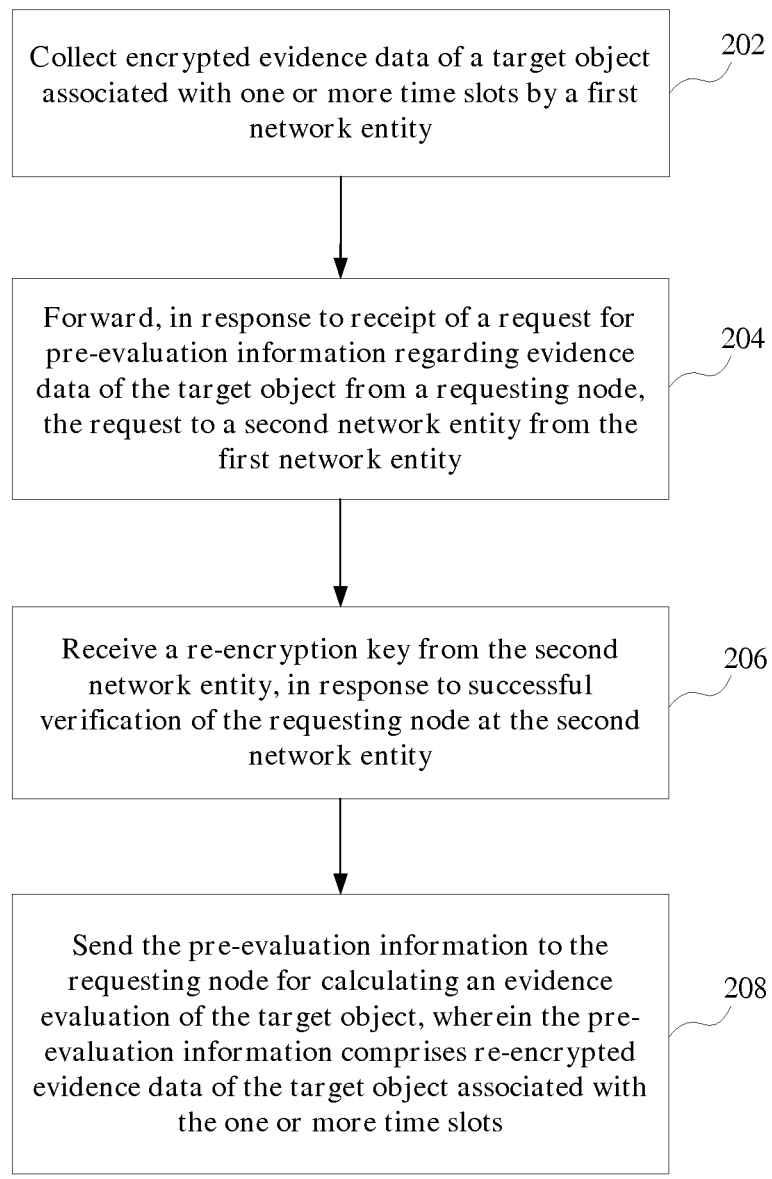
FIG. 2 is a flowchart illustrating a method for privacy-enhanced evidence evaluation, which may be performed at a first network entity in accordance with embodiments of the present invention.

FIG. 2 is a flowchart illustrating a method for privacy-enhanced evidence evaluation, which may be performed at a first network entity in accordance with embodiments of the present invention. It is contemplated that the first network entity described herein may comprise any apparatus capable of performing evidence collection and processing. The apparatus may be any type of evaluation party, device, node, server, control center, service platform, or any combination thereof. The first network entity may be offered by a CSP or other suitable service providers.

Corresponding to the description with respect to FIG. 1, the first network entity can collect encrypted evidence data of a target object associated with one or more time slots, as shown in block 202 of FIG. 2. For example, the first network entity may collect the encrypted evidence data of a target object from one or more evidence providers periodically or in response to an event (for example, upon request). The encrypted evidence data of the target object collected from a corresponding evidence provider at an associated time slot may comprise: encrypted evidence data of the target object by the corresponding evidence provider using an encryption key from a second network entity. According to an exemplary embodiment, the first network entity (such as EP) and the second network entity (such as AP) may be two independent parties who do not collude according to a specified rule or due to business incentive and reason. The one or more evidence providers may comprise a requesting node as illustrated in connection with FIG. 1. Alternatively, the requesting node (such as a reputation center) for the pre-evaluation information regarding evidence data of the target object may not act as an evidence provider. Optionally, respective statistical information for the one or more time slots may be monitored at the first network entity and provided to the requesting node for calculating the evidence evaluation of the target object. For example, the statistical information may indicate a number of evidence providers from which the encrypted evidence data of the target object is collected by the first network entity at an associated time slot. The statistical information may also comprise other data relevant to collection of the encrypted evidence data of the target object, and/or calculation of evidence evaluation of the target object.

According to exemplary embodiments, the encrypted evidence data of the target object collected from the one or more evidence providers at the associated time slot may be processed at the first network entity based at least in part on a homomorphic encryption scheme. In an exemplary homomorphic encryption scheme, a homomorphic encryption key (such as pk) can be used to encrypt an evidence provider's private data (such as trust evidence provided by a node), for example, according to an encryption function E. Thus, E(pk, a1), E(pk, a2), . . . , E(pk, an) may represent respective encryption results for the data (such as a1, a2, . . . , an) to be encrypted. In particular, a specific characteristic of the homomorphic encryption functions may be utilized here, which may be expressed as:

$$E(pk, a1) \times E(pk, a2) = E(pk, a1+a2) \quad (1)$$

Because of the property of associativity, it can be derived that $$E(pk, a1+a2+\ldots+an) = E(pk, a1) \times E(pk, a2) \times \ldots \times E(pk, an) \quad (2)$$

where $E(ai) \neq 0$ for $i=1, 2, \ldots, n$. Accordingly, if sk is the corresponding secret or private key of pk, D is the decryption function with decryption key sk, then the decryption of the data a1 and a2 can be expressed as:

$$D(E(pk, a1) \times E(pk, a2) \times \ldots \times E(pk, an)) = a1+a2+\ldots+an \quad (3)$$

Similarly, it would be appreciated that $$E(pk, a \times c) = E(pk, a) \times c \quad (4)$$

$$D(E(pk, a) \times c) = a \times c \quad (5)$$

With the homomorphic encryption scheme, the first network entity can compute an encryption result of the sum of evidence data of the target object voted by the evidence providers, for example using equation (2), by calculating the encrypted evidence data of the target object collected from these evidence providers. As such, individual evidence on the target object is still private since the collected information from the evidence providers is always encrypted for the first network entity and cannot be tracked by the first network entity.

In response to receipt of a request for pre-evaluation information regarding evidence data of the target object from a requesting node, the first network entity can forward the request to the second network entity, as shown in block 204. The request for the pre-evaluation information may comprise a credential (for example, a public key of the requesting node, or a signed public key of the requesting node provided by the second network entity during registration of the requesting node to the second network entity) for verifying the requesting node. In block 206, the first network entity may receive a re-encryption key from the second network entity, in response to successful verification of the requesting node at the second network entity. According to an exemplary embodiment, by using the re-encryption key, the first network entity can derive or get the re-encrypted evidence data of the target object at an associated time slot, which may be resulted at least in part from the encrypted evidence data of the target object collected from one or more evidence providers at the associated time slot. Then, the first network entity can send the pre-evaluation information to the requesting node for calculating an evidence evaluation of the target object, as shown in block 208, and the pre-evaluation information may comprise the re-encrypted evidence data of the target object associated with the one or more time slots.

A proxy re-encryption scheme may be applied for re-encrypting the encrypted evidence data of the target object collected by the first network entity. For example, an exemplary proxy re-encryption scheme may be represented as a tuple of (possibly probabilistic) polynomial time algorithms (KG; RG; E; R; D), where KG denotes a key generation algorithm, RG denotes a re-encryption key generation algorithm, E denotes an encryption algorithm, R denotes a re-encryption algorithm, and D denotes a decryption algorithm. Thus, (KG; E; D) are the standard key generation, encryption, and decryption algorithms for an underlying public key encryption scheme. Specifically, on input a security parameter, KG outputs a public and private key pair (pk_A; sk_A) for entity A; on input public key pk_A and data m, E outputs a ciphertext CA=E(pk_A; m); on input private key sk_A and ciphertext CA, D outputs the plain data m=D(sk_A; CA); on input (pk_A; sk_A; pk_B), the re-encryption key generation algorithm, RG, outputs a re-encryption key rk_A→B for a proxy entity (such as the second network entity acting as an AP in accordance with exemplary embodiments); and on input rk_A→B and ciphertext CA, the re-encryption function, R, outputs R(rk_A→B; CA)=E(pk_B; m)=CB, which can be decrypted using private key sk_B, where (pk_B; sk_B) is a public and private key pair for entity B, and CB is a ciphertext for data m under the public key pk_B. Thus it can be seen that the proxy re-encryption scheme can make an encryption key on a ciphertext and thus the corresponding ciphertext to be changed (for example, from pk_A to pk_B, and from CA to CB) without revealing the plain data.

With the proxy re-encryption scheme, the second network entity in accordance with exemplary embodiments can enable the first network entity to be able to change the encryption of the collected encrypted evidence data of the target object by re-encrypting the encrypted evidence data of the target object collected by the first network entity, so that the requesting node can decrypt the re-encrypted evidence data of the target object with the requesting node's own key, even if the collected evidence data of the target object from the evidence provider is encrypted with an encryption key (such as a public key) of the second network entity. In an exemplary embodiment, the re-encrypted evidence data of the target object at the associated time slot may comprise: encrypted evidence data of the target object at the associated time slot by using a public key of the requesting node. In this case, the requesting node can decrypt the re-encrypted evidence data of the target object at the associated time slot with the requesting node's private key. Accordingly, the evidence evaluation of the target object may be calculated by the requesting node based at least in part on the decryption result of the re-encrypted evidence data of the target object.

Figure 3:
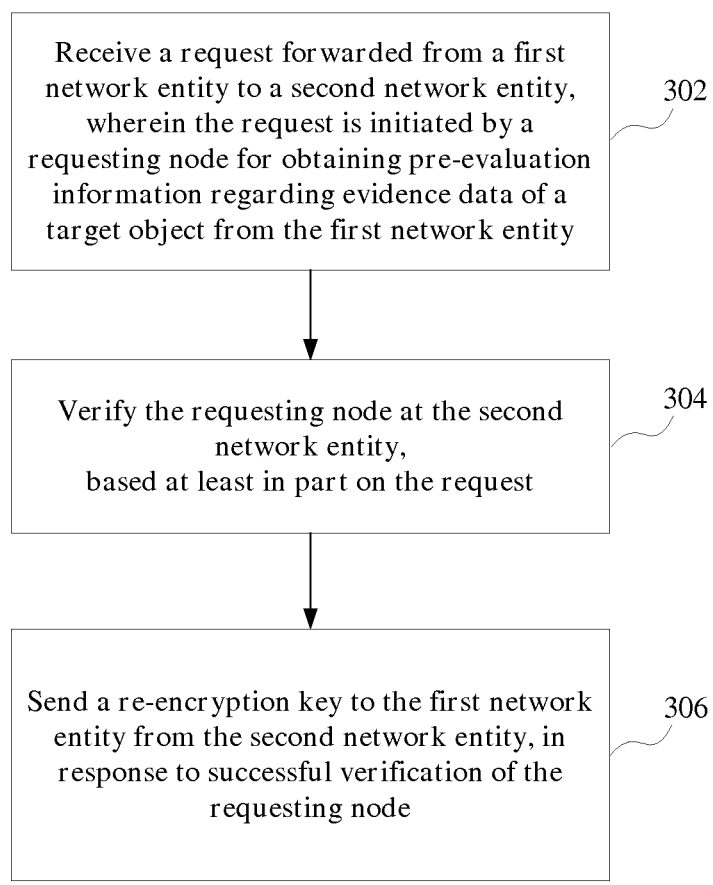
FIG. 3 is a flowchart illustrating a method for privacy-enhanced evidence evaluation, which may be performed at a second network entity in accordance with embodiments of the present invention.

FIG. 3 is a flowchart illustrating a method for privacy-enhanced evidence evaluation, which may be performed at a second network entity in accordance with embodiments of the present invention. It is contemplated that the second network entity described herein may comprise any apparatus capable of performing verification of a requesting node and generating re-encryption keys. The apparatus may be any type of authorized proxy, device, node, server, control center, service platform, or any combination thereof. Corresponding to the descriptions with respect to FIG. 1 and FIG. 2, the second network entity (such as an AP or other suitable authorized entity) may receive a request forwarded from a first network entity (such as an EP or other suitable evaluation entity), as shown in block 302 of FIG. 3, and the request is initiated by a requesting node for obtaining pre-evaluation information regarding evidence data of a target object from the first network entity. As illustrated in connection with FIG. 1, the requesting node may be registered to the second network entity, for example, during a system setup procedure or other information exchange procedures. According to an exemplary embodiment, the request for the pre-evaluation information may comprise a credential for verifying the requesting node. In block 304, the second network entity can verify the requesting node based at least in part on the request. For example, the second network entity may verify the validity of the requesting node's public key and access right. In response to successful verification of the requesting node, the second network entity may send a re-encryption key to the first network entity, as shown in block 306. As such, a proxy re-encryption scheme may be utilized as illustrated in combination with FIG. 2, so as to support privacy-preserved evidence evaluation. For example, based at least in part on the encrypted evidence data of the target object collected by the first network entity from one or more evidence providers (which may comprise the requesting node or not) at an associated time slot, the first network entity can generate the corresponding re-encrypted evidence data of the target object at the associated time slot by using the re-encryption key. In an exemplary embodiment, the encrypted evidence data of the target object collected from a corresponding evidence provider at the associated time slot may comprise: encrypted evidence data of the target object by the corresponding evidence provider using an encryption key from the second network entity (for example, a public key of the second network entity). Accordingly, the re-encrypted evidence data of the target object at the associated time slot may comprise: encrypted evidence data of the target object by using a security key (for example, a public key) of the requesting node. Similarly, the first network entity can generate the pre-evaluation information comprising the re-encrypted evidence data of the target object associated with one or more time slots, which may be used by the requesting node for calculating an evidence evaluation of the target object, as illustrated in combination with FIGS. 1-2.

The various blocks shown in FIGS. 1-3 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

The solution provided by the present invention can enable an evidence evaluation mechanism to support privacy-preserved evidence collection and processing, which can greatly enhance the success of a reputation system or a computing system or a service and user acceptance in real practice. It would be realized that although the privacy-enhanced evidence evaluation herein are described in connection with some exemplary embodiments directed to trust relationship, trust management and trust evaluation, the proposed solution also can be applied to other situations where networking data or statistical information as evidence of a target object needs to be processed or summarized with privacy preservation of data source or information provider. According to an exemplary embodiment, two independent parties who do not collude due to business incentive and reason may be applied for evidence evaluation or trust evaluation. One is an AP who is responsible for generating data re-encryption keys on encrypted data. The other is an EP (for example, offered by a cloud service provider) to process the data collected from a number of trust evidence providers (such as users). For example, the data (which may comprise evidence or some trust information about an entity) may be encrypted at the trust evidence provider by applying the AP's public key, which is disclosed publicly. The EP can process the collected encrypted data, for example, by using a homomorphic technology, in order to get the encrypted trust evaluation result or pre-evaluation result. When a requesting user requests the (pre-)evaluation result from the EP, the EP may forward the request to the AP. In an exemplary embodiment, the AP may check the access policy for the requester and if the check is positive, the AP may generate a re-encryption key for the requester as a response. The EP can re-encrypt the (pre-)evaluation result with the re-encryption key and send it to the requester who is authorized to decrypt the result using its own private key. The requester thus can compute the entity's trust value by aggregating the decrypted result, other relevant information provided by the EP and/or the data accumulated locally. Particularly, the homomorphic technology is used to realize trust evaluation or pre-evaluation based at least in part on the encrypted data collected from a number of trust evidence providers at the EP. Additionally, the proxy based re-encryption is also used to allow only an authorized user to be able to decrypt the (pre-)evaluation result from the EP. The final trust value of a target entity can be calculated at each requesting user by aggregating the decrypted result from the EP and other information together, for example, considering the current technical limitations of homomorphic technology and computation complexity.

Figure 4:
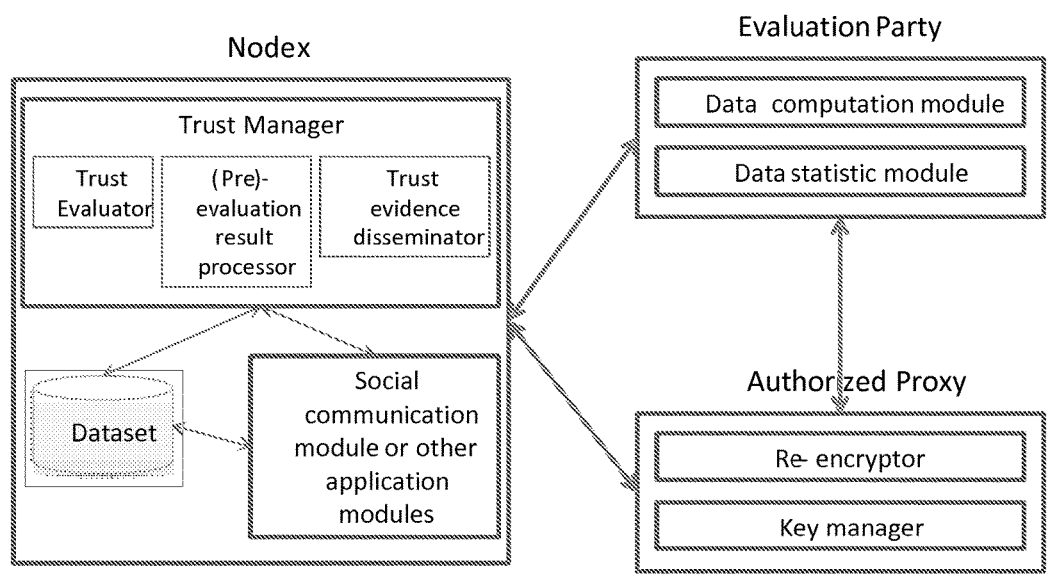
FIG. 4 shows an exemplary system structure in accordance with an embodiment of the present invention.

FIG. 4 shows an exemplary system structure in accordance with an embodiment of the present invention. Although FIG. 4 merely illustrates the system structure in the context of PSN, it will be realized that the solution proposed in accordance with exemplary embodiments also can be applied into any other system suitable for social networking and/or evidence evaluation. FIG. 4 exemplarily shows a PSN system which involves three different kinds of entities: PSN nodes (such as Node x shown in FIG. 4), which may interact with each other for instant or on-line social communications; a first network entity (such as an Evaluation Party (EP) shown in FIG. 4) which may be served by a service provider (such as CSP) for privacy-preserved computation; and a second network entity (such as a centralized Authorized Proxy (AP) shown in FIG. 4) for access policy management and re-encryption key generation. In addition, the PSN node can evaluate evidence or trust of other entities partially based on the result of privacy-preserved data process at the EP and locally accumulated data at the PSN node and other statistical information offered by the EP.

In the exemplary system structure illustrated in FIG. 4, a node (denoted as Node x in FIG. 4) may comprise a social communication module, a trust manager, and optionally a dataset. In an exemplary embodiment, the social communication module may be responsible for PSN or other networking activities based at least in part on the Internet or self-organized ad hoc networks. This module can be replaced by other modules that can support other application scenarios. Or multiple application modules can be embedded inside the node for supporting different applications or services. In another exemplary embodiment, the trust manager may be applied to collect, protect and disseminate trust evidence (for example by a trust evidence disseminator) to the EP that can process or pre-process the encrypted trust evidence for the purpose of evidence/trust evaluation. In particular, a (pre-)evaluation result processor may be deployed at the node to decrypt the (pre-)evaluation result gained from the EP. A trust evaluator at the node can calculate the trust value of an entity by aggregating the above mentioned decrypted result, local information and statistical information from the EP. The dataset may store data related to the functional modules/elements/units at the node, for example, in a secure manner.

The EP illustrated in FIG. 4 may comprise a data computation module and a data statistic module. In accordance with exemplary embodiments, the data computation module can process the encrypted data collected from different nodes. The data statistic module can count the statistical data of trust evidence, for example, how many pieces of evidence are collected for evaluating an entity's trust in a specific time slot, while the statistical data would not disclose the privacy of each evidence provider (such as a PSN node). The AP illustrated in FIG. 4 may comprise a re-encryptor and a key manager. In accordance with exemplary embodiments, the re-encryptor may be applied to check the access right of a data requester and generate re-encryption keys in order to make the (pre-)evaluation result provided by the EP only accessible to the authorized users. The key manager may be used to manage the keys (such as homomorphic key pairs) used in the system in order to achieve privacy-preserved trust evaluation. Meanwhile, at the data computation module, the EP can also re-encrypt the encrypted evidence data of the target object associated with one or more time slots to get the pre-evaluation information (such as (pre-)evaluation result) and make it decrypted by an authorized requestor. The system structure and various components shown in FIG. 4 are only illustrative and not intended to suggest any limitation as to the scope of use or functionality of embodiments of the invention described herein. It could be understood that the system and the corresponding functionalities illustrated in FIG. 4 may be implemented by adding, deleting or replacing some components with respective to those shown in FIG. 4, or by combining or sub-dividing functionalities of those components.

Figure 5:
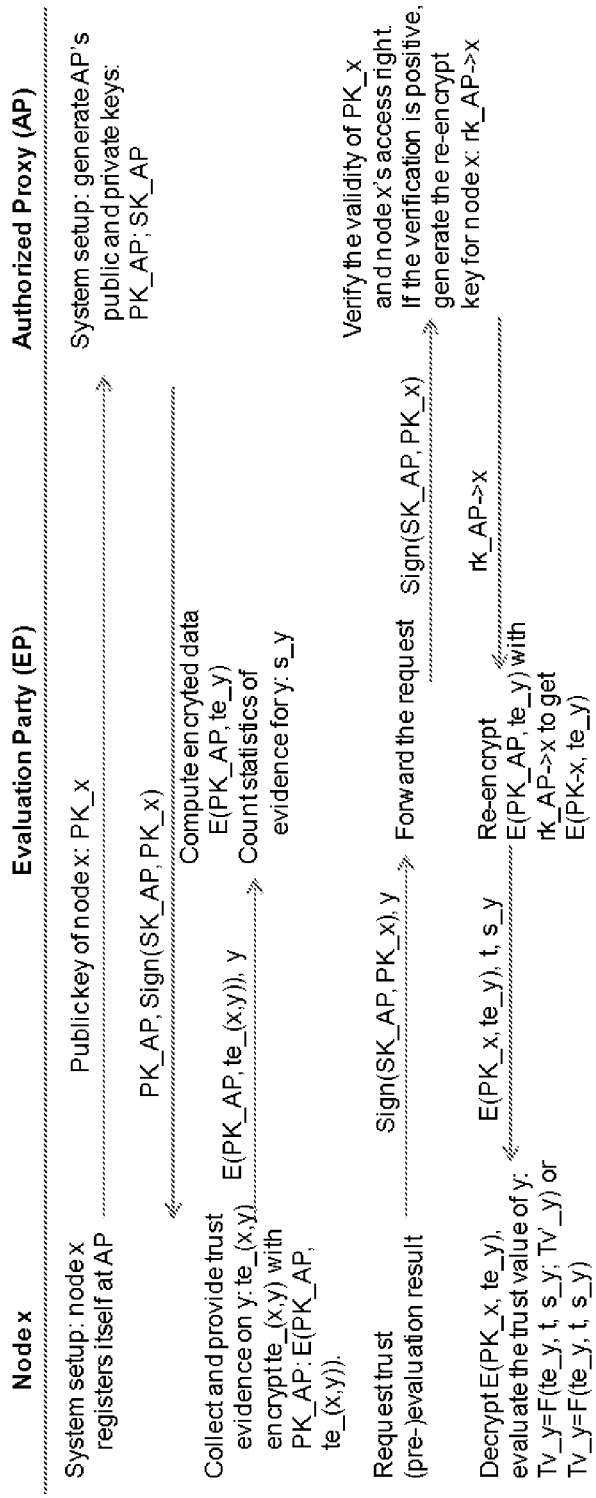
FIG. 5 shows an exemplary procedure of privacy-preserved trust evaluation in accordance with an embodiment of the present invention.

FIG. 5 shows an exemplary procedure of privacy-preserved trust evaluation in accordance with an embodiment of the present invention. The procedure of privacy-preserved trust evaluation may involve several algorithms and/or processes, for example, for encrypting trust evidence, collecting and processing encrypted trust evidence, and performing homomorphic encryption and decryption on the trust evidence, etc. Table 1 summarizes some notions used for exemplarily illustrating the procedures of system setup and privacy-preserved trust evaluation.

TABLE 1

Notation Description

| Key | Description | Remark |
| --- | --- | --- |
| PK_AP | The public key of AP | For homomorphic encryption |
| SK_AP | The private key of AP | For homomorphic decryption |
| PK_x | The public key of node x | Node x may denotes a requesting node and/or a trust evidence provider |
| SK_x | The secret or private key of node x | |
| te_(x, y) | The trust evidence provided by node x on node y | For example, the vote from node x on node y in PSN |

TABLE 1-continued

Notation Description

| Key | Description | Remark |
| --- | --- | --- |
| E(PK_AP, te_(x, y)) | The homomorphic encryption of te_(x, y) with AP's public key | |
| te_y | The aggregated trust evidence of node y | |
| F1(te_y, t, s_y, Tv'_y) or F2(te_y, t, s_y) | The trust evaluation function for evaluating node y's trust | |
| t | The evidence providing time or time slot | |
| s_y | The statistical data of trust evidence of node y | For example, the number of collected trust evidence |
| Tv_y | The trust value of node y | |
| Tv'_y | The previous or local trust value of node y | |

As shown in FIG. 5, during system setup, the AP may generate its public and private key pairs: PK_AP and SK_AP for homomorphic encryption and decryption. It is assumed that a node (such as node x shown in FIG. 5) in PSN may have its own public and private keys maintained by itself. For the sake of security and privacy preservation, node x may register itself into the AP, for example, by providing its public key PK_x, and the AP can respond a successful registration, for example, by issuing its public key PK_AP and signed PK_x in the form of Sign(SK_AP, PK_x). As a trust evidence provider, node x may collect trust evidence on node y and for example vote y as te_(x,y). In order to hide its personal opinion on node y, node x may encrypt te_(x,y) with PK_AP and send E(PK_AP, te_(x,y)) and optionally node y's identity (which may be also encrypted with PK_AP) to the EP. It would be appreciated that not all nodes in networking could be a trust evidence provider, thus node x may not necessarily have any personal opinion on node y and send it to the EP, especially when node x has no interaction with node y. The EP may collect encrypted trust evidence on node y from a number of nodes (such as $x_1, x_2, \ldots, x_n$) in a time slot t. After collecting all encrypted trust evidence on node y in a time slot t, such as E(PK_AP, te_($x_1$,y)), E(PK_AP, te_($x_2$,y)), ..., E(PK_AP, te_($x_n$,y)), the EP can (pre-)evaluate and compute the encrypted evidence data E(PK_AP, te_y), where te_y=te_($x_1$,y)+te_($x_2$,y)+ ... +te_($x_n$,y), and count statistics of evidence (s_y) for node y. In an exemplary embodiment, based at least in part on the homomorphic encryption, the EP can compute the encrypted sum of the trust evidence on node y, by calculating the encrypted evidence on node y provided by a number of nodes (such as $x_1, x_2, \ldots, x_n$) as follows.

$$E(PK\_AP, te\_y) = E(PK\_AP, (te\_(x_1, y) + te\_(x_2, y) + \ldots + te\_(x_m, y))) = E(PK\_AP, te\_(x_1, y)) \times E(PK\_AP, te\_(x_2, y)) \times \ldots \times E(PK\_AP, te\_(x_m, y)) \quad (6)$$

In case node x would like to request a trust pre-evaluation result of node y from the EP, node x may provide its PK_x and the identity of node y. The EP can forward the request to the AP. The AP may verify the validity of PK_x and node x's access right. If the verification is positive, the AP can generate a valid re-encryption key (such as rk_AP→x) and send it to the EP which may use the re-encryption key to re-encrypt E(PK_AP, te_y) to get E(PK_x, te_y) as follows.

$$E(PK\_x, te\_y) = E(PK\_x, (te\_(x_1, y) + te\_(x_2, y) + \ldots + te\_(x_m, y))) \quad (7)$$

Then the EP may send back E(PK_x, te_y), t, s_y to node x which can decrypt E(PK_x, te_y) to get te_y and evaluate trust of node y, for example, by using a specified trust evaluation function F (such as F1 or F2 described hereafter). Considering that the EP may collect encrypted trust evidence on node y in several time slots, for example t={$t_1, t_2, \ldots, t_k$}, the EP can re-encrypt the encrypted trust evidence on node y to get an (pre-)evaluation result regarding time slot $t_k$ as follows.

$$er_{k\_y} = E(PK\_x, (te_{k\_}(x_1,y) + te_{k\_}(x_2,y) + \ldots + te_{k\_}(x_n,y))) \quad (8)$$

When getting (pre-)evaluation results at different time slots from the EP, which may be denoted as Er_y={$er_{1\_}y, er_{2\_}y, \ldots, er_{k\_}y$}, node x can conduct final trust evaluation on node y. In addition, statistics of evidence for node y counted by the EP in several time slots, for example s_y={$s_{1\_}y, s_{2\_}y, \ldots, s_{k\_}y$}, also may be considered in trust evaluation on node y. Two cases of trust evaluation are illustrated here in accordance with exemplary embodiments.

In the first case, node x has its own opinion on the evaluating target node y. For example, node x may be a PSN node that has social interaction experiences with node y, thus node x has its local trust opinion on node y. Alternatively or additionally, node x may have a previous trust value of node y derived from the pre-evaluation results provided by the EP earlier. The previous or local trust value of node y may be denoted as Tv'_y. An exemplary Algorithm I may be utilized to conduct trust evaluation at node x. It is assumed that a number of pre-evaluation results on node y can be achieved by node x from the EP, which may be accumulated at different time slots, for example the pre-evaluation result accumulated at time slot $t_k$ as shown in equation (8). By inputting some parameters like Er_y={$er_{1\_}y, er_{2\_}y, \ldots, er_{k\_y}$}, t={$t_1, t_2, \ldots, t_k$}, s_y={$s_{1\_}y, s_{2\_}y, \ldots, s_{k\_}y$} and Tv'_y, Algorithm I can output the trust value of node y as Tv_y. For example, node x can decrypt Er_y with its private key SK_x to get a set of aggregated trust evidence of node y calculated at different time slots as follows.

$$te\_y = \{te_{k\_}y, te_{k\_}y, \ldots, te_{k\_}y\} \quad (9)$$

where the aggregated trust evidence of node y calculated at time slot $t_k$ can be denoted as:

$$te_{k\_}y = te_{k\_}(x_1,y) + te_{k\_}(x_2,y) + \ldots + te_{k\_}(x_n,y) \quad (10)$$

Then node y's trust value can be calculated at node x, for example by a function of Tv_y(tc)=F1(te_y, s_y, Tv'_y, tc), where tc is the current time of calculating node y's trust value, and F1 is a concrete function which may be designed by considering the statistical information of trust evidence at $t_k$, the evidence collection time $t_k$ and the sum of the trust evidence. For example, if $s_{k\_}y$ is the number of evidence collected at time slot $t_k$, and $te_{k\_}y$ is the sum of votes provided by the trust evidence providers at time slot $t_k$, then the trust evaluation function F1 can be described as:

$$Tv\_y(tc) = F1(te\_y, s\_y, Tv'\_y, tc) = \alpha * Tv'\_y + \beta * \frac{1}{K} \sum_{k=1}^{K} \theta(s_{k\_}y) * \frac{te_{k\_}y}{s_{k\_}y} * \left(1 - \left|\frac{te_{k\_}y}{s_{k\_}y} - Tv'\_y\right|\right) * e^{-\frac{|t_k - tc|^2}{\tau}} \quad (11)$$

where $\alpha, \beta$ are weight parameters which may be predefined as required and $\alpha + \beta = 1$, K is the total number of time slots during which the encrypted trust evidence is collected, $\theta(s_{k\_}y)$ is the Rayleigh cumulative distribution function that is applied to model the impact of integer number $s_{k\_}y$ on reputation and $$\theta(s_{k\_}y) = \left\{1 - \exp\left(\frac{-(s_{k\_}y)^2}{2\sigma^2}\right)\right\} \quad (12)$$

where $\sigma > 0$, is a parameter that inversely controls how fast the number $s_{k\_}y$ impacts the increase of $\theta(s_{k\_}y)$. Parameter a can be set from 0 to theoretically $\infty$, to capture the characteristics of different scenarios. $\tau$ is a parameter to control the time decaying. Herein, the number of trust evidence contributors' impact on the trust evaluation is considered and time decaying is applied to avoid potential attacks on trust evaluation (such as on-off attack and conflict behavior attack). Meanwhile, vote deviation $$\left(1 - \left|\frac{te_{k\_}y}{s_{k\_}y} - Tv'\_y\right|\right)$$

is also applied to fight against bad mouthing and collaborative bad mouthing attack. In this way, the proposed solution can achieve trustworthy trust evaluation and at the same time preserve the privacy of trust evidence providers since after homomorphic encryption, individual opinion or experiences on a node can be hidden.

In the second case, node x has no opinion on the evaluating target node y. For example, node x may be a PSN reputation center that has no social interaction experiences with node y, or node x has no previous trust value of node y derived from the pre-evaluation results provided by the EP earlier. In this case, Tv'_y is not available and an exemplary Algorithm II may be utilized to conduct trust evaluation at node x. It is assumed that a number of pre-evaluation results on node y can be achieved by node x from the EP, which may be accumulated at different time slots, for example the pre-evaluation result accumulated at time slot $t_k$ as shown in equation (8). Similar to Algorithm I, by inputting some parameters like Er_y={$er_{1\_}y, er_{2\_}y, \ldots, er_{k\_}y$}, t={$t_1, t_2, \ldots, t_k$}, and s_y={$s_{1\_}y, s_{2\_}y, \ldots, s_{k\_}y$}, Algorithm II can output the trust value of node y as Tv_y. For example, node x can decrypt Er_y with its private key SK_x to get a set of aggregated trust evidence of node y calculated at different time slots, as expressed in equations (9) and (10).

Then node y's trust value can be calculated at node x, for example by Tv_y (tc)=F2(te_y, s_y, tc), where tc is the current time of calculating node y's trust value, and F2 is a concrete function which may be designed by considering the statistical information of trust evidence at $t_k$, the evidence collection time $t_k$ and the sum of the trust evidence. For example, if $s_{k\_}y$ is the number of evidence collected at time slot $t_k$, and $te_{k\_}y$ is the sum of votes provided by the trust evidence providers at time slot $t_k$, then the trust evaluation function F2 can be described as:

$$Tv\_y(tc) = F2(te\_y, s\_y, tc)$$
$$= \frac{1}{K} \sum_{k=1}^{K} \theta(s_{k\_}y) * \frac{te_{k\_}y}{s_{k\_}y} * e^{-\frac{|t_k - tc|^2}{\tau}} \quad (13)$$

where the definitions of parameters (such as K and $\tau$) and functions (such as $\theta(s_{k\_}y)$) in equation (13) are the same as in equation (11). Thus it can be seen that the trust evaluation function F2 used in Algorithm II may be regarded as a special case of the trust evaluation function F1 used in Algorithm I, where the terms regarding Tv'_y and thus the weight parameters α, β are omitted from F1.

Many advantages can be obtained by the solution presented in accordance with the exemplary embodiments. For example, in an aspect of privacy preservation, the proposed solution can support privacy preserved evidence/trust evaluation by applying homomorphic encryption and proxy based re-encryption. Using the homomorphic encryption, an individual trust evidence provider's opinion/experience on a trustee can be hidden, thus its privacy is greatly preserved since the aggregated (pre-)evaluation result calculated by an EP would not disclose individual information. In addition, this encrypted (pre-)evaluation result can only be accessed by authorized parties by applying proxy based re-encryption. This further improves the system security and privacy. The collected trust evidence data and (pre-)encryption result are always encrypted at the EP, thus the EP has no way to know their plain texts and is impossible to track the privacy of evidence providers. Since the EP and the AP do not collude, the AP cannot know the above information either. The identity information of an entity (such as a target trustee) provided by an evidence provider can be also encrypted and hidden from the EP, thus the EP cannot get such plain information when it extracts the (pre-)evaluation result about the entity. With this way, the identity information of the target trustee provided by the evidence provider can also be hidden from the EP. Although applying the homomorphic encryption to compute encrypted data, the proposed solution can still achieve trustworthy trust evaluation by overcoming some potential attacks on trust evaluation mechanism, such as bad mouthing attack, on-off attack and conflict behavior attack. The evidence provided by the trusted nodes can be finally well considered in the trust evaluation and calculation, especially at a node that has direct local interaction experiences with the target trustee node. Thus the proposed solution can guarantee the security and robustness of evidence evaluation.

In aspects of scalability, compatibility and flexibility, the proposed solution can support evaluating any system entity's trust. The trust evidence can be collected from different sources and experiences in different application scenarios. Particularly, it can support not only PSN, but also other application scenarios with such a common system model that system nodes report encrypted trust evidence on other nodes to an EP, and the EP conducts pre-evaluation on collected encrypted data. If a system node requests the encrypted result in order to do final trust evaluation on a target system node locally, the EP would re-encrypt the result by asking the approval of an AP that manages access policies. The proposed solution is compatible with the current advance of homomorphic encryption technologies. If more computing operations can be supported by homomorphic encryption technologies at the EP, the invented system can still work. For example, heavy computation load can be carried by the EP that is offered by a CSP. In addition, the proposed solution can support evaluating trust at either a system node or a centralized party no matter it has direct experience with the evaluating node or not.

Figure 6:
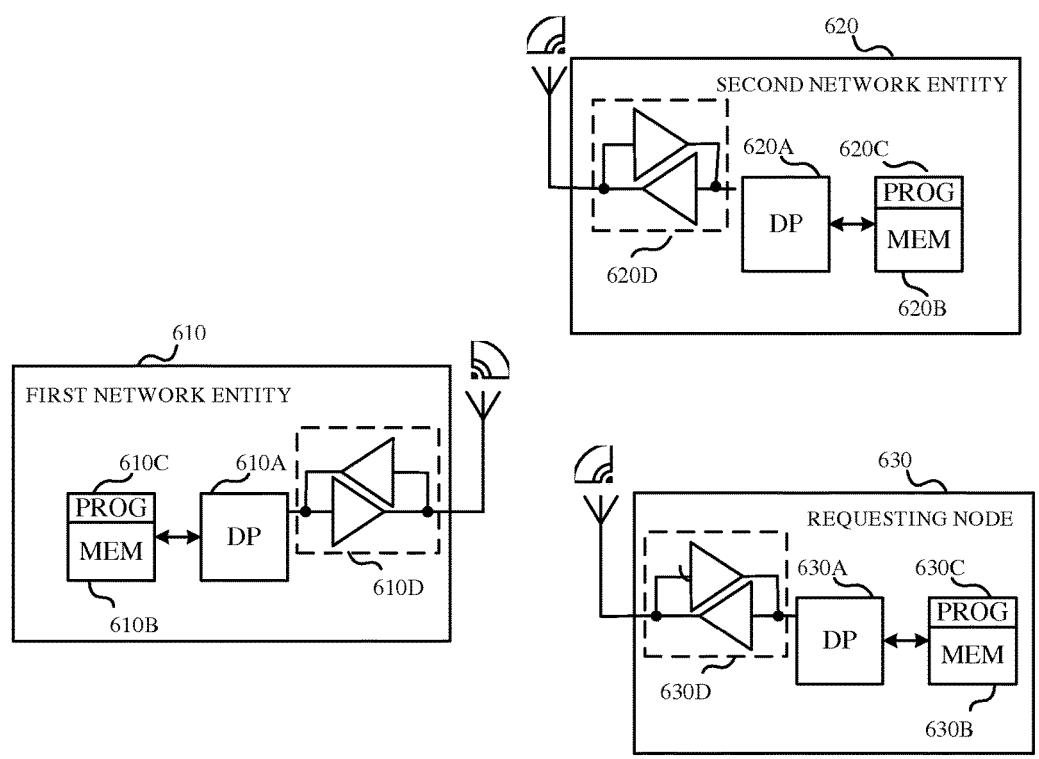
FIG. 6 is a simplified block diagram of various apparatuses which are suitable for use in practicing exemplary embodiments of the present invention.

FIG. 6 is a simplified block diagram of various apparatuses which are suitable for use in practicing exemplary embodiments of the present invention. In FIG. 6, a requesting node 630 (such as a terminal, a device, a station or a reputation center) may be adapted for communicating with other nodes in social networking and/or one or more network entities such as a first network entity 610 and a second network entity 620. The first network entity 610 (such as an EP or other apparatuses suitable for evidence collection and evaluation) and the second network entity 620 (such as an AP or other authorized apparatuses suitable for access policy management and re-encryption keys generation) may be adapted for communicating with each other or a requesting node (such as the requesting node 630) for (pre-)evaluation information regarding evidence of a target object (not shown in FIG. 6).

In an exemplary embodiment, the first network entity 610 may comprise at least one processor (such as a data processor (DP) 610A shown in FIG. 6), and at least one memory (such as a memory (MEM) 610B shown in FIG. 6) comprising computer program code (such as a program (PROG) 610C shown in FIG. 6). The at least one memory and the computer program code may be configured to, with the at least one processor, cause the first network entity 610 to perform operations and/or functions described in combination with FIGS. 1-5. In an exemplary embodiment, the first network entity 610 may optionally comprise a suitable transceiver 610D for communicating with an apparatus such as the second network entity 620, the requesting node 630 or other network entity (not shown in FIG. 6).

In an exemplary embodiment, the second network entity 620 may comprise at least one processor (such as a data processor (DP) 620A shown in FIG. 6), and at least one memory (such as a memory (MEM) 620B shown in FIG. 6) comprising computer program code (such as a program (PROG) 620C shown in FIG. 6). The at least one memory and the computer program code may be configured to, with the at least one processor, cause the second network entity 620 to perform operations and/or functions described in combination with FIGS. 1-5. In an exemplary embodiment, the second network entity 620 may optionally comprise a suitable transceiver 620D for communicating with an apparatus such as the first network entity 610, the requesting node 630 or other network entity (not shown in FIG. 6).

In an exemplary embodiment, the requesting node 630 may comprise at least one processor (such as a data processor (DP) 630A shown in FIG. 6), and at least one memory (such as a memory (MEM) 630B shown in FIG. 6) comprising computer program code (such as a program (PROG) 630C shown in FIG. 6). The at least one memory and the computer program code may be configured to, with the at least one processor, cause the requesting node 630 to perform operations and/or functions described in combination with FIGS. 1-5. In an exemplary embodiment, the requesting node 630 may optionally comprise a suitable transceiver 630D for communicating with an apparatus such as the first network entity 610, the second network entity 620, a social networking node or other network entity (not shown in FIG. 6).

For example, at least one of the transceivers 610D, 620D, 630D may be an integrated component for transmitting and/or receiving signals and messages. Alternatively, at least one of the transceivers 610D, 620D, 630D may comprise separate components to support transmitting and receiving signals/messages, respectively. The respective DPs 610A, 620A and 630A may be used for processing these signals and messages.

Alternatively or additionally, the first network entity 610, the second network entity 620 and the requesting node 630 may comprise various means and/or components for implementing functions of the foregoing steps and methods in FIGS. 1-5. In an exemplary embodiment, a first network entity 610 may comprise: collecting means for collecting encrypted evidence data of a target object associated with one or more time slots; forwarding means for forwarding, in response to receipt of a request for pre-evaluation information regarding evidence data of the target object from a requesting node (such as the requesting node 630), the request to a second network entity (such as the second network entity 620) from the first network entity; receiving means for receiving a re-encryption key from the second network entity, in response to successful verification of the requesting node at the second network entity; and sending means for sending the pre-evaluation information to the requesting node for calculating an evidence evaluation of the target object, wherein the pre-evaluation information comprises re-encrypted evidence data of the target object associated with the one or more time slots, and wherein the re-encrypted evidence data of the target object at an associated time slot is resulted at least in part from the encrypted evidence data of the target object collected from one or more evidence providers at the associated time slot, by using the re-encryption key.

In an exemplary embodiment, the second network entity 620 may comprise: receiving means for receiving a request forwarded from a first network entity (such as the first network entity 610), wherein the request is initiated by a requesting node (such as the requesting node 630) for obtaining pre-evaluation information regarding evidence data of a target object from the first network entity; verifying means for verifying the requesting node at the second network entity, based at least in part on the request; and sending means for sending a re-encryption key to the first network entity from the second network entity, in response to successful verification of the requesting node; wherein the pre-evaluation information comprises re-encrypted evidence data of the target object associated with one or more time slots and is used for calculating an evidence evaluation of the target object, and wherein the re-encrypted evidence data of the target object at an associated time slot is resulted at least in part from encrypted evidence data of the target object collected by the first network entity from one or more evidence providers at the associated time slot, by using the re-encryption key.

In an exemplary embodiment, the requesting node 630 may comprise: sending means for sending a request for pre-evaluation information regarding evidence data of a target object to a first network entity (such as the first network entity 610); obtaining means for obtaining the pre-evaluation information from the first network entity, in response to successful verification of the requesting node at a second network entity (such as the second network entity 620); and calculating means for calculating an evidence evaluation of the target object based at least in part on the pre-evaluation information, wherein the pre-evaluation information comprises re-encrypted evidence data of the target object associated with one or more time slots, and wherein the re-encrypted evidence data of the target object at an associated time slot is resulted at least in part from encrypted evidence data of the target object collected by the first network entity from one or more evidence providers at the associated time slot, by using a re-encryption key from the second network entity.

At least one of the PROGs 610C, 620C, 630C is assumed to comprise program instructions that, when executed by the associated DP, enable an apparatus to operate in accordance with the exemplary embodiments, as discussed above. That is, the exemplary embodiments of the present invention may be implemented at least in part by computer software executable by the DP 610A of the first network entity 610, by the DP 620A of the second network entity 620 and by the DP 630A of the requesting node 630, or by hardware, or by a combination of software and hardware.

The MEMs 610B, 620B and 630B may be of any type suitable to the local technical environment and may be implemented using any suitable data storage technology, such as semiconductor based memory devices, flash memory, magnetic memory devices and systems, optical memory devices and systems, fixed memory and removable memory. The DPs 610A, 620A and 630A may be of any type suitable to the local technical environment, and may comprise one or more of general purpose computers, special purpose computers, microprocessors, digital signal processors (DSPs) and processors based on multi-core processor architectures, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It will be appreciated that at least some aspects of the exemplary embodiments of the inventions may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be realized by one of skills in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

Although specific embodiments of the invention have been disclosed, those having ordinary skills in the art will understand that changes can be made to the specific embodiments without departing from the spirit and scope of the invention. The scope of the invention is not to be restricted therefore to the specific embodiments, and it is intended that the appended claims cover any and all such applications, modifications, and embodiments within the scope of the present invention.

What is claimed is:

1. A method, comprising:
    sending, by a requesting node and to a first network entity, a request for pre-evaluation information regarding evidence data of a target object, wherein the evidence data comprises knowledge related to the target object, and wherein the target object comprises a networking node configured to communicate with the requesting node;
    in response to successful verification of the requesting node at a second network entity, obtaining, by the requesting node and from the first network entity, the pre-evaluation information, the pre-evaluation information comprising re-encrypted evidence data of the target object associated with one or more time slots; and calculating, by the requesting node with a private key of the requesting node, an evidence evaluation of the target object based at least in part on one of the pre-evaluation information, a local evidence record of the target object at the requesting node, and statistical information obtained from the first network entity for at least one of the one or more time slots;

wherein the re-encrypted evidence data at an associated time slot results at least in part from encrypted evidence data of the target object collected by the first network entity from one or more evidence providers at the associated time slot, by at least using a re-encryption key from the second network entity, and wherein the statistical information indicates a quantity of the one or more evidence providers from which the encrypted evidence data is collected.

2. The method according to claim 1, wherein the one or more evidence providers comprise the requesting node.

3. The method according to claim 1, wherein the encrypted evidence data of the target object collected from a corresponding evidence provider at the associated time slot comprises the encrypted evidence data of the target object by the corresponding evidence provider using an encryption key from the second network entity.

4. The method according to claim 1, wherein the encrypted evidence data of the target object collected from the one or more evidence providers at the associated time slot is processed at the first network entity based at least in part on a homomorphic encryption scheme.

5. The method according to claim 1, wherein the re-encrypted evidence data of the target object at the associated time slot comprises the encrypted evidence data of the target object at the associated time slot by using a public key of the requesting node.

6. The method according to claim 1, wherein the evidence evaluation of the target object is calculated by at least:

decrypting the re-encrypted evidence data of the target object by using the private key of the requesting node; and estimating the evidence evaluation of the target object based at least in part on a decryption result of the re-encrypted evidence data of the target object.

7. The method according to claim 1, wherein the request for the pre-evaluation information comprises a credential for verifying the requesting node.

8. An apparatus, comprising:
at least one processor; and
at least one memory comprising computer program code,
the at least one memory and the computer program code configured to, with the at least one processor, cause the apparatus at least to:
send, to a first network entity, a request for pre-evaluation information regarding evidence data of a target object, wherein the evidence data comprises knowledge related to the target object, and wherein the target object comprises a networking node configured to communicate with the apparatus;
obtain, from the first network entity and in response to successful verification of the apparatus at a second network entity, the pre-evaluation information, the pre-evaluation information comprising re-encrypted evidence data of the target object associated with one or more time slots; and
calculate, with a private key of the apparatus, an evidence evaluation of the target object based at least in part on one of the pre-evaluation information, a local evidence record of the target object at the apparatus, and statistical information obtained from the first network entity for at least one of the one or more time slots;

wherein the re-encrypted evidence data at an associated time slot results at least in part from encrypted evidence data of the target object collected by the first network entity from one or more evidence providers at the associated time slot, by using a re-encryption key from the second network entity, and wherein the statistical information indicates a quantity of the one or more evidence providers from which the encrypted evidence data is collected.

9. The apparatus according to claim 8, wherein the one or more evidence providers comprise the apparatus.

10. The apparatus according to claim 8, wherein the encrypted evidence data of the target object collected from a corresponding evidence provider at the associated time slot comprises the encrypted evidence data of the target object by the corresponding evidence provider using an encryption key from the second network entity.

11. The apparatus according to claim 8, wherein the encrypted evidence data of the target object collected from the one or more evidence providers at the associated time slot is processed at the first network entity based at least in part on a homomorphic encryption scheme.

12. The apparatus according to claim 8, wherein the re-encrypted evidence data of the target object at the associated time slot comprises the encrypted evidence data of the target object at the associated time slot by using a public key of the apparatus.

13. The apparatus according to claim 8, wherein the evidence evaluation of the target object is calculated by at least:

decrypting the re-encrypted evidence data of the target object by using the private key of the apparatus; and estimating the evidence evaluation of the target object based at least in part on a decryption result of the re-encrypted evidence data of the target object.

14. The apparatus according to claim 8, wherein the request for the pre-evaluation information comprises a credential for verifying the apparatus.

* * * * *